(12) United States Patent
Gibson

(10) Patent No.: US 9,039,266 B2
(45) Date of Patent: May 26, 2015

(54) REFLECTIVE COLOR DISPLAY WITH BACKLIGHTING

(75) Inventor: Gary Gibson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 156 days.

(21) Appl. No.: 13/882,176

(22) PCT Filed: Oct. 27, 2010

(86) PCT No.: PCT/US2010/054280
§ 371 (c)(1),
(2), (4) Date: Apr. 27, 2013

(87) PCT Pub. No.: WO2012/057750
PCT Pub. Date: May 3, 2012

(65) Prior Publication Data
US 2013/0208500 A1    Aug. 15, 2013

(51) Int. Cl.
F21V 8/00 (2006.01)
F21V 9/08 (2006.01)
G02F 1/1335 (2006.01)

(52) U.S. Cl.
CPC .............. *G02B 6/0033* (2013.01); *F21V 9/08* (2013.01); *G02F 1/1336* (2013.01); *G02F 2001/133614* (2013.01); *G02F 2001/133626* (2013.01); *G02B 6/0043* (2013.01); *G02B 6/0061* (2013.01)

(58) Field of Classification Search
CPC ................. G02F 1/1336; G02F 2001/133614; G02F 2001/133626; F21V 9/08; G02B 6/0033; G02B 6/0043; G02B 6/0061
USPC ............................ 362/614, 623–625; 349/65
See application file for complete search history.

(56) References Cited

U.S. PATENT DOCUMENTS

| 2001/0055208 A1* | 12/2001 | Kimura ..................... 362/260 |
| 2008/0029710 A1* | 2/2008 | Sekiya et al. ............ 250/432 R |
| 2008/0074583 A1* | 3/2008 | Li et al. ..................... 349/71 |

FOREIGN PATENT DOCUMENTS

| JP | 07-225377 A | 8/1995 |
| JP | 2001-356701 A | 12/2001 |
| JP | 2006-308858 A | 11/2006 |
| JP | 2008-041361 A | 2/2008 |
| JP | 2008-170496 A | 7/2008 |

OTHER PUBLICATIONS

International search report and written opinion in corresponding PCT patent application, PCT/US2010/054280, dated Jul. 27, 2011.

* cited by examiner

*Primary Examiner* — Thomas M Sember
(74) *Attorney, Agent, or Firm* — Hewlett-Packard Patent Department

(57) ABSTRACT

A reflective color pixel has a top surface for receiving ambient light for front lighting, a plurality of sub-pixels including a first sub-pixel, and a waveguide disposed underneath the sub-pixels for transmitting light for backlighting to the sub-pixels. The first sub-pixel includes a first luminescent material configured to absorb either the ambient light or the light for backlighting and generate light of a first color.

15 Claims, 5 Drawing Sheets

REFLECTIVE COLOR DISPLAY WITH BACKLIGHTING

BACKGROUND

Reflective electronic displays are a new type of display device that is gaining popularity. For instance, reflective displays have been used in electronic book readers. In contrast to conventional flat-panel displays, such as LCD displays, that require their own light sources, reflective displays utilize ambient light for illumination to display images that can mimic the look of "ink-on-paper" printed materials. Due to the use of ambient light for illumination, reflective displays have the significant advantages of lower power consumption compared to conventional displays, and the ability to be viewed under bright ambient light. Most of the reflective displays currently commercially available are monochromatic displays, and it is desirable to have reflective displays that can produce color images with satisfactory color brightness. Moreover, it is also desirable to have reflective color displays that can be viewed in dim ambient light or darkness.

BRIEF DESCRIPTION OF THE DRAWINGS

Some embodiments of the invention are described, by way of example, with respect to the following figures.

DETAILED DESCRIPTION

Figure 1:
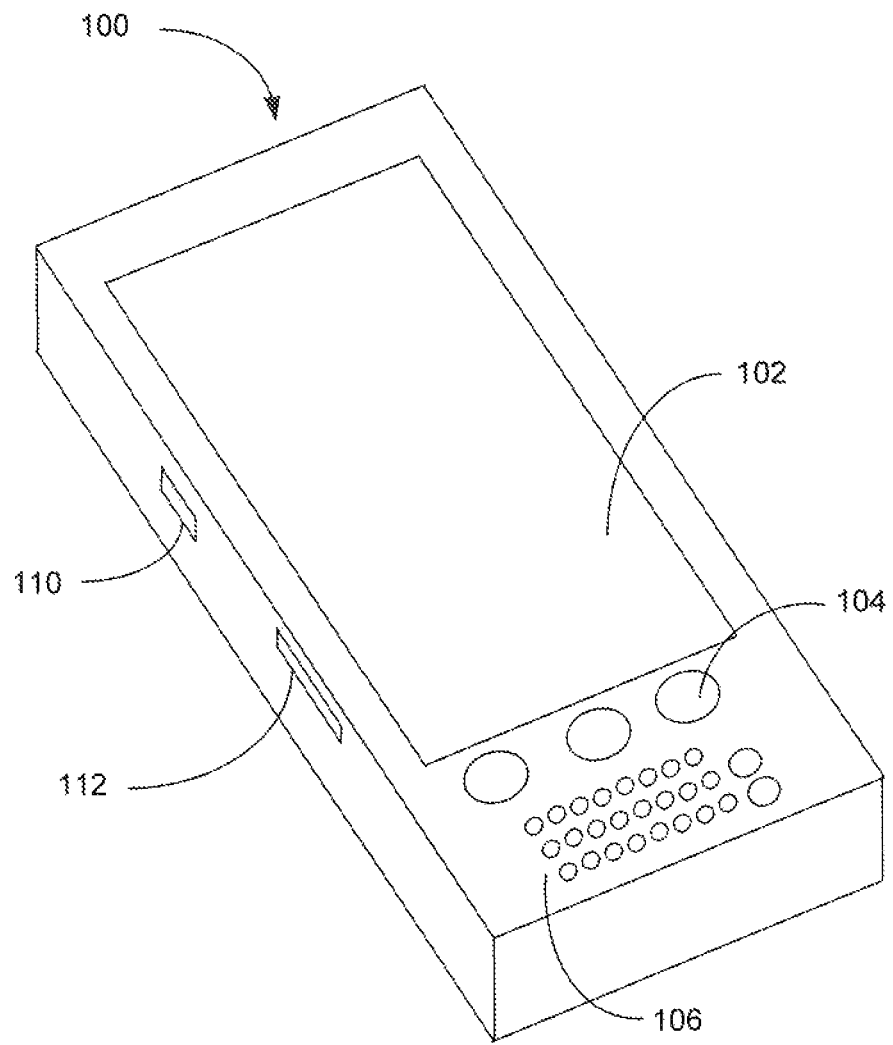
FIG. 1 is a schematic view of a reflective color display device of an example of the invention.

FIG. 1 shows an example of a display device in accordance with the invention. As described in greater detail below, the display device 100 has a reflective color display screen 102 that is capable of displaying images of high color quality and is configured to utilize backlighting to allow the device to be viewed in low light conditions.

The device 100 has a built-in power source, such as a rechargeable battery, and has electronic circuitry and software for its operations. As illustrated in FIG. 1, the device 100 may have buttons 104 for controlling image display functions and may have a keypad 106 for data entry. Moreover, the display screen 102 may be a touch-screen that can display control features such as scroll bars or control buttons. The display device 100 further includes means for receiving data of images to be displayed. For instance, the device 100 may have USB ports 110 for receiving data and power transmitted through a USB cable, or to receive a USB memory stick with the image date stored thereon. The device 100 may also have receptacles, such as an SD card slot 112, for other types of data storage devices. Alternatively, the device 100 may have wireless transmission capabilities for wirelessly downloading image data from a computer or a network such as the internet.

Figure 2:
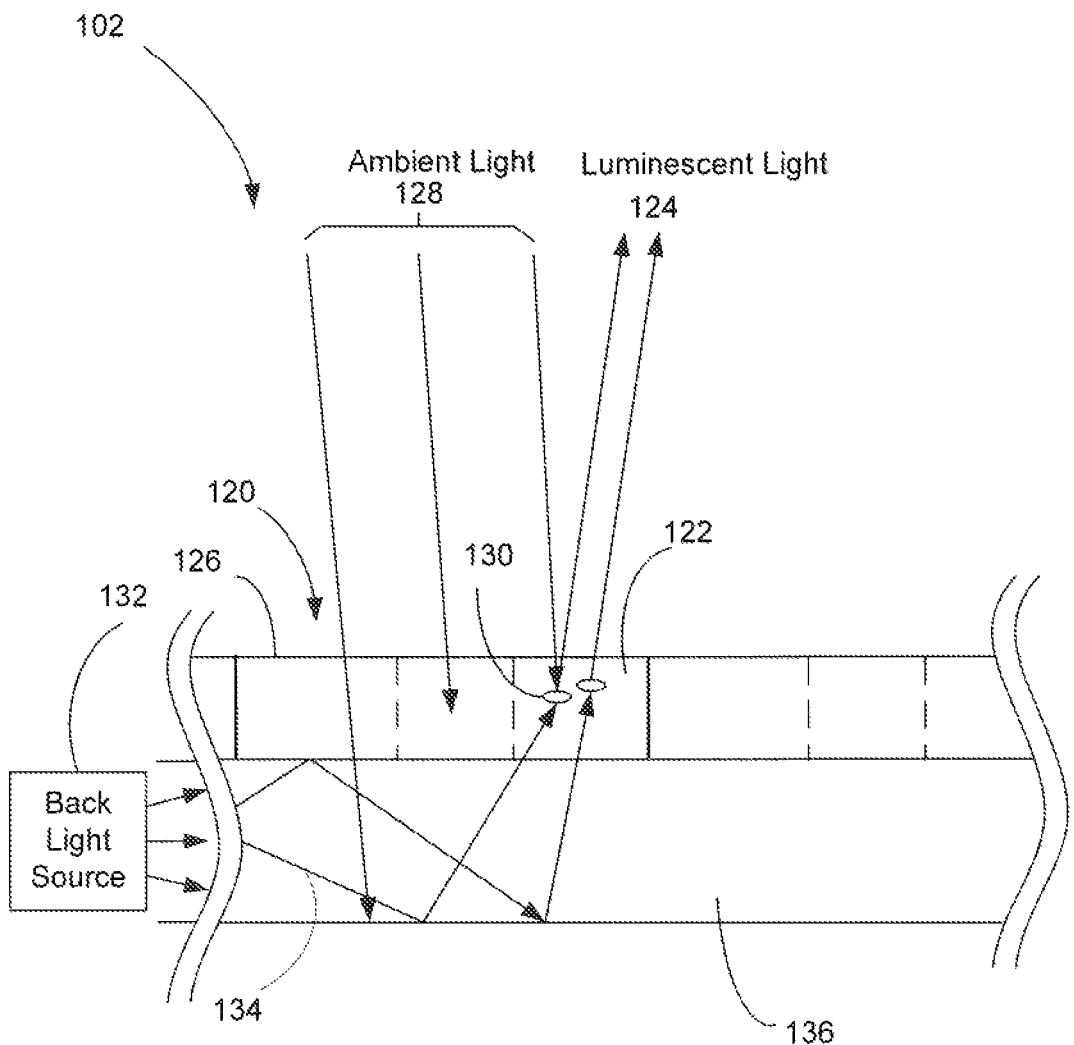
FIG. 2 is a schematic cross-sectional view of a color pixel of the reflective display device of FIG. 1 constructed according to an example of the invention to provide backlighting.

FIG. 2 shows a schematic representation of a pixel 120 of the display screen 102 in accordance with an embodiment of the invention. The pixel 120 has a plurality of sub-pixels, including a first sub-pixel 122. The pixel 120 has a top surface 126, upon which ambient light 128 impinges. The ambient light illuminates the viewing side, or the front side, of the display pixel 120. As described in greater detail below, the ambient light 128 is used as an energy source for the sub-pixels of the display pixel 120 to generate light of selected colors for viewing by a user. For instance, the first sub-pixel 122 may be intended to emit red light, while the other sub-pixels may be mended to emit blue light and green light, respectively.

To provide efficient utilization of ambient light to provide satisfactory colors, the display device 102 may utilize luminescence to generate the colors to be emitted by the sub-pixels. For instance, the first sub-pixel 122 may include a luminescent material 130 that absorbs light of shorter wavelengths and emit light in the red band. As shown in FIG. 2, the ambient light 128 impinging on the top surface 126 of the first sub-pixel 122 is absorbed by the luminescent material 130 and converted to red light. The luminescent light 124 is then emitted through the top surface 126 for viewing by a user. Luminescence can also be used by the other sub-pixels of the color pixel 120 for generating other colors, such as green and blue. In this regard, a luminescent material can strongly absorb light over a broad rand of wavelengths shorter than a threshold wavelength and re-emit a large fraction of the absorbed energy at energies below the absorption threshold. Thus, some otherwise wasted light can be converted into a desired color, thereby enabling more efficient utilization of ambient light to provide greater lightness and better color saturation.

To allow viewing even in weak ambient light, the display device 102 is configured to provide backlighting to the sub-pixels of the color pixel 120. To that end, the color pixel 120 has a waveguide 136 disposed under the sub-pixels, and the display device has a light source 132 for generating light for backlighting the color pixels of the display screen 102. The light source 132 is optically coupled to the waveguide 136 to inject its output into the waveguide. The back light 134 is guided by the waveguide 136 to the respective sub-pixels, and may then be absorbed by the luminescent material of a sub-pixel to generate the luminescent light to be emitted by that sub-pixel. When the ambient light 128 for front lighting is too weak to provide sufficient illumination, the light source 136 can be turned on to back light the pixels 120 to generate a viewable image. Also, the backlighting can be turned on even in intermediate lighting conditions to enhance the brightness of one or more of the primary display colors, such as blue. In this way, the display device may provide a brighter and more balanced color gamut under all lighting conditions, and can be viewed under weak ambient light.

Figure 3:
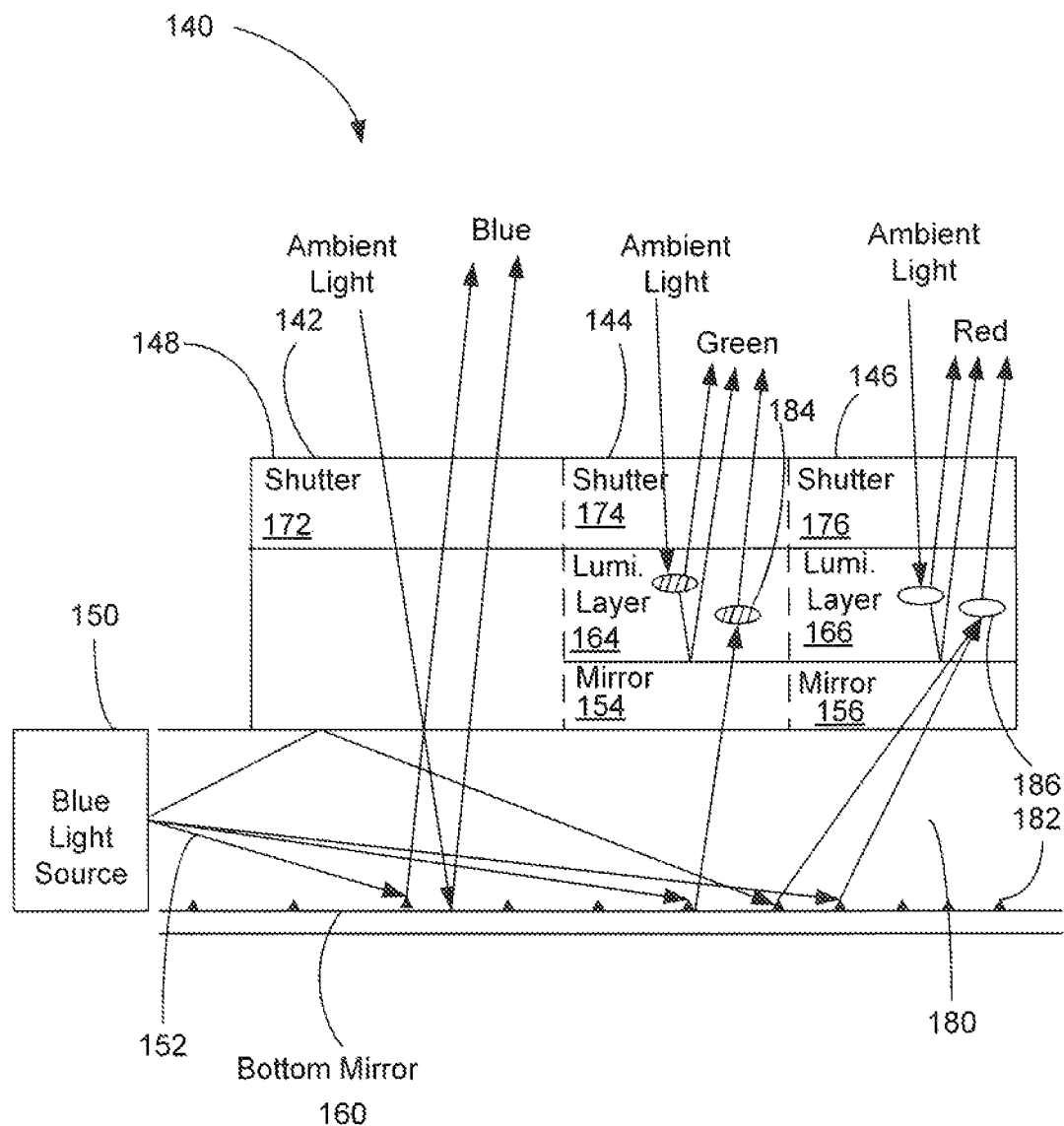
FIG. 3 is a schematic cross-sectional view of a more detailed example of a reflective color pixel with backlighting.
Figure 4:
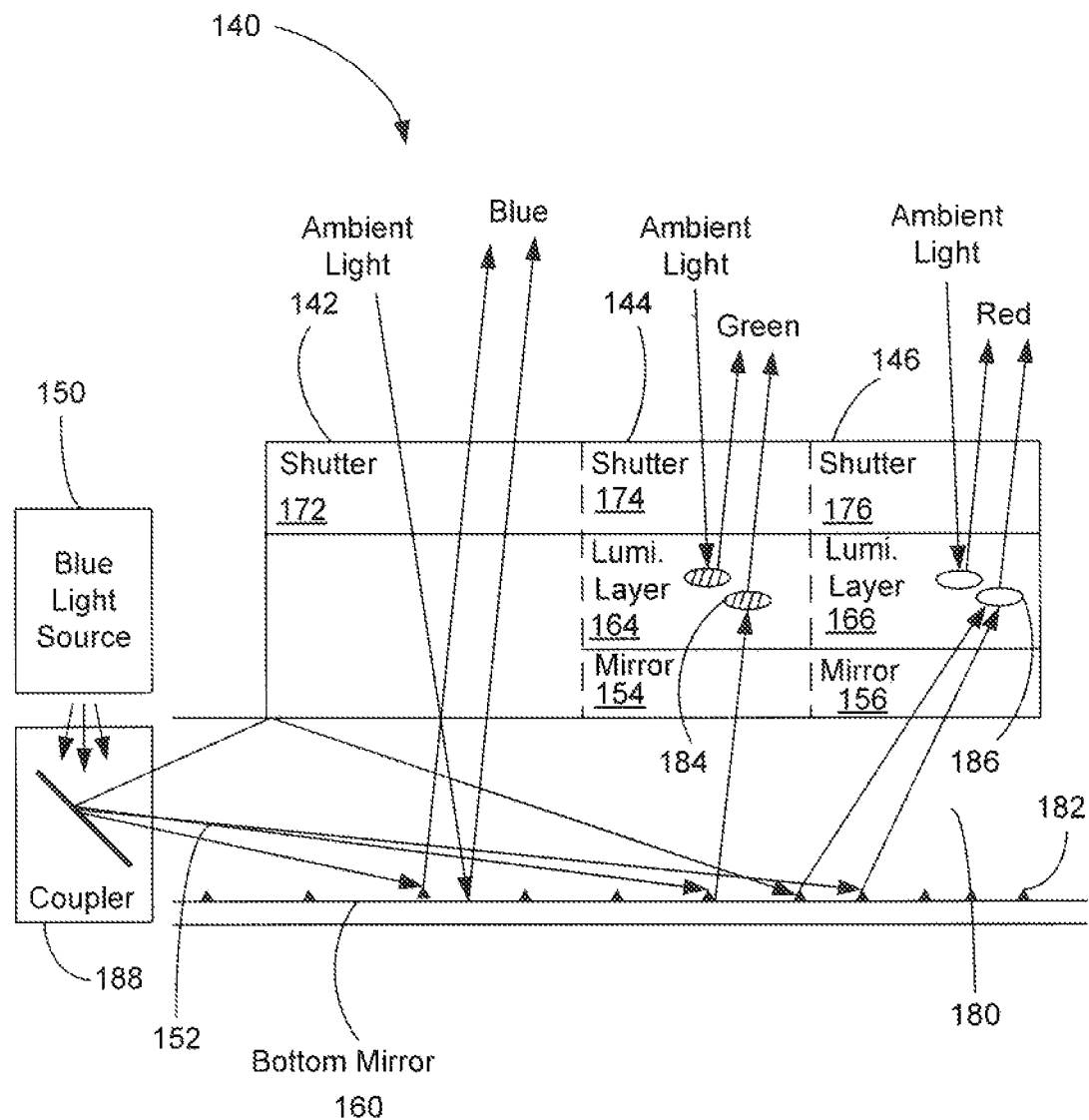
FIG. 4 is a schematic cross-sectional view of an example with an alternative configuration for coupling the output of a light source for backlighting to reflective color pixels.
Figure 5:
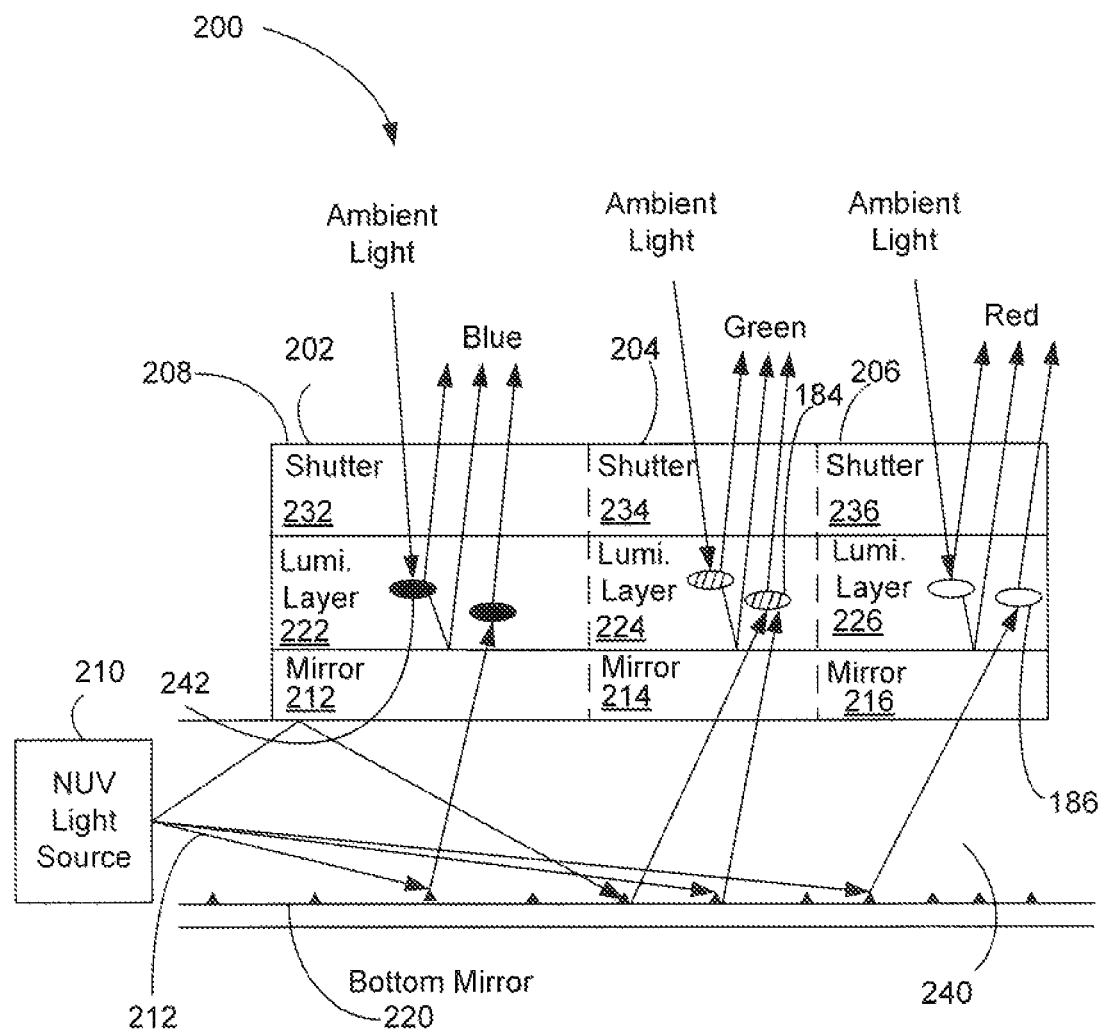
FIG. 5 is a schematic cross-sectional view of another example of a reflective color pixel with backlighting.

FIGS. 3-5 show more detailed examples of reflective color pixels that combine vibrant colors generated using luminescence with the enhanced viewing flexibility provided by backlighting. Turning first to FIG. 3, in this example, the reflective color pixel 140 has three sub-pixels 142, 144, 146, for generating blue, green, and red light, respectively. Alternatively, other sets of primary colors can be used for display. As described in greater detail below, the blue sub-pixel 142 in this example generates blue light by means of wave-length specific reflection, while the green and red sub-pixels 144 and 146 use mainly luminescence to generate their respective colors.

The red sub-pixel 146 has three upper layers that include a shutter 176, a luminescent layer 166, and a color-selective mirror 156. Similarly, the green sub-pixel 144 has a shutter 174, a luminescent layer 164, and a color-selective mirror 154. The blue sub-pixel also has a shutter 172, but does not have a luminescent layer or a mirror. The shutters 172, 174, 176 of the sub-pixels 142, 144, 146 can be independently actuated to adjust the light transmission through each sub-pixel to result in the desired lightness. In some embodiments, they may be black to clear (K/clr) electro-optic (EO) shutters, which may be in the form of, for example dichroic dye-LC guest-host systems, electrophoretic, electro-wettng, or electro-fluidic cells. The shutters are capable of switching from transparent through shades of gray to opaque (black).

The luminescent layer 166 of the red sub-pixel 146 contains luminophores 186 (illustrated as unfilled ovals) that absorb a broad spectrum of shorter wavelength light and convert it to wavelengths in the red. For example, the red luminophores may absorb wavelengths shorter than 600 nm, and emit in the range of 600-630 nm. These luminophores may be a series of organic relay dyes in a transparent host polymer. All but the first one of these dyes absorb in a wavelength band that overlaps strongly with the emission band of the previous one, allowing Förster energy transfer from one dye to the next in the series. Similarly, the luminescent layer of the green sub-pixel contains luminophores 184 (illustrated as hashed ovals) for converting ambient light into green light, and each of the green luminophores may be a series of relay dyes. The green luminophores 184 may, for example, absorb wavelengths shorter than 540 nm, and emit in the range of 540-570 nm.

The upper mirror 154 of the green sub-pixel 144 has a reflection band selected to reflect in the green luminescence range. The mirror 154 is provided so that the luminescent light generated by the green luminophores 184 in the downward direction is reflected toward the upper surface of the pixel for viewing. The mirror 154 may also reflect ambient green wavelengths not absorbed by the green-emitting luminophores 184. Similarly, the reflection hand of the mirror 156 of the red sub-pixel 146 is set to reflect the red light generated by the red luminophores 186, and may also reflect ambient red wavelengths that are too long to be absorbed by the red luminophores. The mirrors 154 and 156 may be made to be diffusive to help the luminescent light escape instead of being trapped in waveguide modes within the luminescent layers. Also, a low refractive index layer may be placed between the luminescent layers 164, 166 and the shutters 174, 176 to minimize trapping of luminescent light in waveguide modes, particularly in the shutter layer where waveguided light could be rapidly absorbed. Including this low refractive index layer improves the fraction of luminescent light that can be coupled out of the device.

To provide the light for backlighting the pixel 140, the display includes a light source 150. For conducting the light generated by the light source 150 to the pixels of the display, a waveguide 180 is disposed underneath the sub-pixels 142, 144, 146. The waveguide 180 may be formed of a layer of transparent material with a high refractive index, for instance polymers such as polycarbonate and polyethylene terephthalate (PET), or inorganic materials such as high index glasses and indium tin oxide, or metal oxides, or metal oxide loaded polymers. Optionally, a low index layer may be included above the high index layer to provide a greater change in the index of refraction at the interface, which can make the waveguide less "leaky." The waveguide 180 may extend below all pixels of the reflective color display. Alternatively, the display may be divided into multiple segments, and each segment may have its on waveguide that extends below all pixels in that segment. For each waveguide, multiple light sources can be used.

In the example of FIG. 3, the light source 150 is disposed at the edge of the waveguide 180 and oriented such that the light 152 generated by it is projected directly into the waveguide. In other embodiments, such as the example shown in FIG. 4, a coupler 188 may be used to couple the output of the light source 150 into the waveguide 180. For instance, the coupler 188 may be an angled reflector, and the light source 150 may be located near the upper or lower surface of the waveguide 180. Other forms of couplers, such as curved waveguides or optical fibers, or other forms of refractive or diffractive optics, may also be used. The use of a coupler provides flexibility in the location and orientation of the light source 150 relative to the waveguide 180.

Returning to FIG. 3, the light 152 generated by the light source 150 has a wavelength that can be absorbed by the luminophores of the color sub-pixels. In the example of FIG. 3, the light source 150 emits blue light. The blue light source 150 may be, for example, a blue LED, or a blue-emitting OLED based on organic polymers or small molecules. The blue back light 152 can be absorbed by the green and red luminophores 184, 186 in the green and red sub-pixels 144, 146 to generate green and red luminescent light, respectively. In the meantime, the blue hack light can also be emitted through the blue sub-pixel 142 for viewing. To that end, a bottom mirror 160 is disposed underneath the waveguide 180. The bottom mirror 160 is color selective such that it reflects in the range of wavelengths (e.g., <485 nm) to be emitted by the blue sub-pixel 142, which overlaps with the range of wavelengths provided by the blue back light.

To provide a controlled distribution of the back light, scattering structures 182 can be included in the waveguide 180 to help direct the back light into the sub-pixels. The scattering structures 182 can have various shapes, such as triangular or other profiles, for scattering incident light into different directions. The density of these scattering structures 182 can be designed to provide the desired distribution of the back light. For instance, the density of the scattering structures 182 may increase with increasing distance from the blue light source 150 to compensate for decreasing light intensity within the waveguide and homogenize the light power reaching the sub-pixels across the display. The density of scattering structures can also be varied for the different color sub-pixels.

In operation, the color pixel 140 may be front-lit by the ambient light and/or backlit by the light generated by the light source 150. If the ambient light is sufficiently bright for the display to produce a viewable image, the light source 150 may be turned off. For the pixel 140 to produce only the red color, the shutter 176 of the red sub-pixel 146 is opened, and the shutters 174, 172 of the green and blue sub-pixels are closed. The ambient light incident on the red-pixel 146 goes through the shutter 176, and those wavelengths that are within the absorption band of the luminophores 186 are absorbed by the luminophores. The red light generated by the luminophores 186 from this absorbed light either goes directly through the shutter 176 and the top surface 148 or is reflected by the mirror 156 and then goes through the shutter 176 and the top surface. The red portion of the ambient light that is not absorbed by the red luminophores 186 may also be reflected by the red mirror 156 to the viewer.

Under low ambient light conditions, the light source 150 may be turned on to provide backlighting. The blue light 152 generated by the light source is guided by the waveguide 180 to the red sub-pixel 146 and reaches the luminescent layer 166. The red luminophores 186 absorbs the blue back light and convert it to red light for emission by the red sub-pixel 146. It should be noted that the blue light source 150 can be turned unto augment the output of the red sub-pixel even when the ambient light is not completely gone. In other words, ambient lighting (or front lighting) and backlighting can be used simultaneously to provide a viewable image.

The operation of the green sub-pixel 144 is similar to that of the red sub pixel 146. For the pixel 140 to generate only green light, the shutter 174 of the green sub-pixel 144 is opened and the shutters 172, 176 of the blue and red sub-pixels are closed. The green luminophores 184 absorb shorter wavelengths of the ambient light and or the blue backlight transmitted by the waveguide 180, and generate green luminescent light as the output of the green sub-pixel. In this case, ambient red light that is not absorbed by the green luminophores 184 is absorbed by the blue-reflective bottom mirror 160. To that end, the bottom mirror 160 may comprise a blue-reflecting Bragg stack over an absorption layer that absorbs at least red and possibly all visible wavelengths. Alternatively, the green mirror 154 may include a red absorbing layer positioned adjacent to the green reflecting layer.

The blue sub-pixel 142, in contrast, returns blue light through wavelength-selective reflection. For the pixel 140 to return only blue, the shutter 172 of the blue sub-pixel 142 is opened and the shutters 174, 176 of the green and red sub-pixels are closed. The blue portion of the ambient light incident on the blue sub-pixel 142 is reflected by the blue-reflecting bottom mirror 160 and goes through the top surface 148 for viewing. When the light source 150 is turned on the blue back light generated by the light source is reflected by the bottom mirror 160 and can be used to augment the emission of the blue sub-pixel.

To create a black state, all the shutters 172, 174, 176 of the three sub-pixels are closed. To create a white state, all the shutters are opened, if the sub-pixel areas and relevant efficiencies are balanced so as to create a net white state. Otherwise, some of the shutters can be partially opened in order to create a balanced white.

The choices of relative sub-pixel areas and the density of scattering structures below each color sub-pixel depend on the desired color gamut and prevalent ambient lighting conditions for the intended applications. For example, tradeoffs can be made to provide a balanced color gamut and good white point under bright light conditions where the primary benefit of the blue emissive source is boosting of the blue, versus the need to boost all three sub-pixels under low light conditions. If the blue emissive source is sufficiently bright, the display can be designed so as to provide a balanced gamut under bright ambient lighting, and the blue sub-pixel shutters can be partially closed in low ambient lighting. One way to do this is to use a high density of scattering structures in the waveguide below the blue sub-pixels so that they are heavily augmented by the blue emissive source without being large. The red and green sub-pixel areas can then be made larger because the blue sub-pixel doesn't need to be as large as it otherwise would. Thus, a greater benefit can be obtained from the luminescent gain available in the red and green sub-pixels. The amplitude of the emissive blue light source can also be varied depending on the lighting conditions. Potentially, it could also be varied depending on the relative fraction of blue, red, and green sub-pixels that are "on" during the display of a given image.

FIG. 5 shows another example of a reflective color pixel 200 that combines luminescence with backlighting. The color pixel 200 has a blue sub-pixel 202, a green sub-pixel 204, and a red sub-pixel 206. Each of the blue, green, and red sub-pixels has three top layers that include a shutter, a luminescent layer, and a wavelength-selective mirror. A waveguide 240 is disposed below the three sub-pixels 202, 204, and 206, and a light source 210 for backlighting is optically coupled to the waveguide.

In this example, the shutters 234, 236, luminescent layers 224, 226, and mirrors 214, 216 of the red and green sub-pixels 204, 206 are structured and operate similarly as those in the example of FIG. 3. In contrast with the example of En 3, the pixel 200 utilizes luminescence for the emission of blue light. The shutter 232 of the blue sub-pixel 202 controls light transmission into and out of the blue sub-pixel. The luminescent layer 222 of the blue sub-pixel 202 contains blue luminophores 242 (illustrated as solid ovals) that absorb near UV (NUV) light and convert it to blue emission (e.g., 455-485 nm). The mirror 212 reflects at least the band of wavelengths generated by the blue luminophores 242, and may also reflect some ambient blue wavelengths that are not in the emission band of the blue luminophores.

The light source 210 generates NUV light 212, which is guided by the waveguide 240 to the sub-pixels 202, 204, 206. To that end, the waveguide 240 has a bottom mirror 220 that reflects the NUV hack light. In operation, the ambient light provides front lighting. The blue luminophores 242 absorb shorter wavelengths in the ambient light and generate blue luminescent light. The upper mirror 212 of the blue sub-pixel 202 reflects the blue luminescent light toward the top surface 208 for viewing. When the light source 210 is turned on, the MTV back light 212 is distributed by the waveguide 240 and absorbed by the blue luminophores 242 in the blue sub-pixel 202 to generate blue light. The red and green sub-pixels 204, 206 operate in a similar fashion to convert either the ambient light or the NUV bark light, or both into red and green emissions, respectively, for viewing.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A reflective color display pixel comprising:
   a top surface for receiving ambient light for front lighting;
   a plurality of sub-pixels including a first sub-pixel; and
   a waveguide disposed underneath the sub-pixels for transmitting light for backlighting to the sub-pixels;
   wherein the first sub-pixel includes a first luminescent material configured to absorb the ambient light and the light for backlighting and generate light of a first color from the absorbed ambient light and the absorbed light for backlighting.

2. A reflective color display pixel as in claim 1, wherein the plurality of sub-pixels further include a second sub-pixel and a third sub-pixel for generating light of a second color and a third color, respectively.

3. A reflective color display pixel as in claim 2, wherein the waveguide is configured to transmit light in a blue or near-UV range.

4. A reflective color display pixel as in claim 3, wherein the first color is selected from the group of red and green.

5. A reflective color display pixel as in claim 1, wherein the first sub-pixel includes a luminescent layer containing the first luminescent material, a shutter disposed above the luminescent layer, and a color-selective mirror disposed below the luminescent layer and above the waveguide.

6. A reflective color display pixel as in claim 1, wherein the waveguide includes a bottom mirror for reflecting the light for backlighting.

7. A reflective color display pixel as in claim 6, wherein the bottom mirror of the waveguide has light scattering structures distributed thereon with varying density.

8. A reflective color display pixel as in claim 6, wherein the plurality of sub-pixels further include a second sub-pixel, and wherein the second sub-pixel is configured to allow the light for backlighting reflected by the bottom mirror to pass through as output of the second sub-pixel.

9. A reflective color display comprising:
- a plurality of pixels, each pixel having a top surface for receiving ambient light for front lighting and a first sub-pixel for generating a first color, the first sub-pixel containing a first luminescent material for converting ambient light received by the pixel into light of the first color;
- a waveguide disposed underneath the pixels; and
- a light source generating light for backlighting the pixels, the light source being optically coupled to the waveguide for injecting the light for backlighting into the waveguide, the waveguide being configured to transmit the light for backlighting into the first sub-pixel for absorption by the first luminescent material to generate light of the first color.

10. A reflective color display as in claim 9, wherein the light source generates light in a blue or near-UV range.

11. A reflective color display as in claim 10, wherein each pixel further includes a second sub-pixel and a third sub-pixel for generating light of a second color and a third color, respectively.

12. A reflective color display as in claim 11, wherein the light source generates blue light, and wherein the second sub-pixel of each pixel is configured to emit the blue light transmitted via the waveguide for viewing.

13. A reflective color display as in claim 11, wherein the light source emits near UV light, and wherein the second sub-pixel of each pixel includes a second luminescent material for converting the near UV light into light of a blue color.

14. A reflective color display as in claim 9, wherein the first sub-pixel includes a luminescent layer containing the first luminescent material, a shutter disposed above the luminescent layer, and a color-selective mirror disposed below the luminescent layer and above the waveguide.

15. A reflective color display as in claim 9, wherein the waveguide includes a bottom mirror with light scattering structures for reflecting the light for back illumination into the pixels.

* * * * *